(12) United States Patent
Macklin et al.

(10) Patent No.: US 8,205,796 B2
(45) Date of Patent: Jun. 26, 2012

(54) TRANSIT SECURITY DETECTION SYSTEM (75) Inventors: Jon D. Macklin, El Cajon, CA (US);
Walter C. Bonneau, Jr., Escondido, CA (US); Raymond DeKozan, Le Mesa, CA (US); Bruce D. Roberts, San Diego, CA (US); Joseph VJ Ravenis, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 362 days.

(21) Appl. No.: 12/189,705

(22) Filed: Aug. 11, 2008

(65) Prior Publication Data

US 2009/0072024 A1 Mar. 19, 2009

Related U.S. Application Data

(63) Continuation-in-part of application No. 12/123,387, filed on May 19, 2008, now Pat. No. 7,936,265, and a continuation-in-part of application No. 12/062,390, filed on Apr. 3, 2008, now Pat. No. 7,677,449, which is a continuation of application No. 11/329,640, filed on Jan. 11, 2006, now Pat. No. 7,367,494.

(60) Provisional application No. 60/955,009, filed on Aug. 9, 2007, provisional application No. 60/938,677, filed on May 17, 2007, provisional application No. 60/949,228, filed on Jul. 11, 2007, provisional application No. 60/659,830, filed on Mar. 8, 2005.

(51) Int. Cl.
*G06K 5/00* (2006.01)

(52) U.S. Cl. .................. 235/382; 235/375; 235/380

(58) Field of Classification Search .................. 235/375, 235/380, 382, 487, 435, 451, 492
See application file for complete search history.

(56) References Cited

U.S. PATENT DOCUMENTS 4,821,118 A 4/1989 Lafreniere et al.
4,975,222 A * 12/1990 Yoshino et al. ............... 252/586
(Continued)

FOREIGN PATENT DOCUMENTS

DE 4322274 A1 1/1995
(Continued)

OTHER PUBLICATIONS

"Explosives and Narcotics Detection," retrieved off internet http://www.geindustrial.com/ge-interlogix/iontrack/prod_tech_overview.html on Dec. 2, 2005, 1 page.
(Continued)

*Primary Examiner* — Daniel Hess
*Assistant Examiner* — Paultep Savusdiphol
(74) *Attorney, Agent, or Firm* — Kilpatrick Townsend & Stockton LLP (57) ABSTRACT

A method and system for processing exposure to an item of interest in a transit system is disclosed. Detectors are sensitive to the item of interest such as chemicals, biologic compound, radiation, nuclear, and/or explosives to produce detector or other information. A threat assessment value is determined periodically. The fare media is read for card information, which can be used in addition to detector or other information. The assessment value along with the card information, detector information and/or other information is used in determining if an action is taken, for example, if a user can pass a portal to get access to the transit system.

22 Claims, 9 Drawing Sheets

U.S. PATENT DOCUMENTS

| | | | |
|---|---|---|---|
| 5,200,614 A | | 4/1993 | Jenkins |
| 5,491,326 A | | 2/1996 | Marceau et al. |
| 5,491,337 A | | 2/1996 | Jenkins et al. |
| 5,722,835 A | | 3/1998 | Pike |
| 5,741,984 A | * | 4/1998 | Danylewych-May et al. ............... 73/864.71 |
| 5,818,047 A | * | 10/1998 | Chaney et al. ............. 250/341.8 |
| 6,073,499 A | | 6/2000 | Settles |
| 6,765,198 B2 | | 7/2004 | Jenkins et al. |
| 6,914,668 B2 | * | 7/2005 | Brestel et al. ................... 356/72 |
| 6,952,163 B2 | * | 10/2005 | Huey et al. .................... 340/521 |
| 6,975,227 B1 | * | 12/2005 | Nishikawa et al. ........... 340/541 |
| 6,995,839 B1 | * | 2/2006 | Shapiro ........................ 356/301 |
| 7,047,829 B2 | | 5/2006 | Napoli |
| 7,109,859 B2 | | 9/2006 | Peeters |
| 7,116,798 B1 | * | 10/2006 | Chawla ........................ 382/100 |
| 7,139,406 B2 | * | 11/2006 | McClelland et al. .......... 382/100 |
| 7,212,113 B2 | * | 5/2007 | Zanovitch ..................... 340/540 |
| 7,271,720 B2 | | 9/2007 | Tabe |
| 7,367,494 B2 | | 5/2008 | Macklin et al. |
| 7,491,948 B2 | * | 2/2009 | Gordon et al. ............. 250/472.1 |
| 7,522,040 B2 | | 4/2009 | Passmore et al. |
| 7,677,449 B2 | | 3/2010 | Macklin et al. |
| 7,801,833 B2 | * | 9/2010 | Bhatt et al. .................... 705/325 |
| 2002/0024450 A1 | | 2/2002 | Townsend et al. |
| 2002/0084900 A1 | * | 7/2002 | Peterson et al. ........... 340/573.1 |
| 2003/0128099 A1 | | 7/2003 | Cockerham |
| 2003/0143119 A1 | | 7/2003 | Schwartz et al. |
| 2004/0073439 A1 | * | 4/2004 | Shuster ............................ 705/1 |
| 2004/0117638 A1 | * | 6/2004 | Monroe ....................... 713/186 |
| 2004/0165750 A1 | | 8/2004 | Chew |
| 2004/0169076 A1 | * | 9/2004 | Beale et al. ................... 235/382 |
| 2004/0190757 A1 | * | 9/2004 | Murphy et al. ............... 382/115 |
| 2004/0204915 A1 | * | 10/2004 | Steinthal et al. .............. 702/188 |
| 2004/0227929 A1 | * | 11/2004 | Brestel et al. ................... 356/72 |
| 2005/0019220 A1 | | 1/2005 | Napoli |
| 2005/0022581 A1 | | 2/2005 | Sunshine |
| 2005/0137890 A1 | * | 6/2005 | Bhatt et al. ........................ 705/1 |
| 2005/0288937 A1 | | 12/2005 | Verdiramo |
| 2006/0180647 A1 | | 8/2006 | Hansen |
| 2006/0243796 A1 | * | 11/2006 | Macklin et al. ............... 235/382 |
| 2006/0290496 A1 | | 12/2006 | Peeters |
| 2007/0102294 A1 | | 5/2007 | Dorisio et al. |
| 2009/0115605 A1 | | 5/2009 | Ravenis, II et al. |
| 2010/0219932 A1 | | 9/2010 | Macklin et al. |

FOREIGN PATENT DOCUMENTS

| | | |
|---|---|---|
| EP | 599291 A2 | 6/1994 |
| EP | 1182622 A1 | 2/2002 |
| WO | WO 03/075119 A2 | 9/2003 |
| WO | WO 2004/114242 A1 | 12/2004 |
| WO | WO2006/035392 A1 | 4/2006 |
| WO | WO 2006/096246 A1 | 9/2006 |
| WO | WO2006/130528 A1 | 12/2006 |
| WO | WO 2007/081922 A2 | 7/2007 |

OTHER PUBLICATIONS

"Explosives and Narcotics Detection—StreetLab," retrieved off Internet http://www.geindustrial.com/ge-interlogix/iontrack/prod_streetlab.html on Dec. 2, 2005, 1 page.

"Explosives and Narcotics Detection—Itemiser[3]" retrieved off internet http://www.geindustrial.com/ge-interlogix/iontrack/prod_itemiser.html on Dec. 2, 2005, 1 page.

"Explosives and Narcotics Detection—VaporTracer[2]" retrieved off internet http://www.geindustrial.com/ge-interlogix/iontrack/prod_vaportracer.html on Dec. 2, 2005, 1 page.

"Explosives and Narcotics Detection—EntryScan[3]" retrieved off internet http://www.geindustrial.com/ge-interlogix/iontrack/prod_entryscan.html on Dec. 2, 2005, 1 page.

* cited by examiner

Front Layer

Fig. 7A

Inlay Core

Fig. 7B

Back Layer

TRANSIT SECURITY DETECTION SYSTEM

This application is a non-provisional of U.S. Provisional Patent Application No. 60/955,009, filed Aug. 9, 2007 and a continuation-in-part of U.S. patent application Ser. No. 12/123,387, filed May 19, 2008, which is a non-provisional of U.S. Provisional Patent Application No. 60/938,677, filed May 17, 2007; and a non-provisional of U.S. Provisional Patent Application No. 60/949,228, filed Jul. 11, 2007; all of which are incorporated by reference in their entirety for all purposes. This application is also a continuation-in-part of U.S. patent application Ser. No. 12/062,390, filed Apr. 3, 2008, which issued as U.S. Pat. No. 7,677,449 on Mar. 16, 2010, which is a continuation of U.S. patent application Ser. No. 11/329,640, filed Jan. 11, 2006, which issued as U.S. Pat. No. 7,367,494 on May 6, 2008, which claims the benefit of U.S. Provisional Application No. 60/659,830 filed on Mar. 8, 2005.

BACKGROUND OF THE INVENTION

This disclosure relates in general to chemical, biological, radiation and explosive detection and, but not by way of limitation, to smartcard detection in a system.

Detection of trace particles or emanations from compounds which may represent a threat to the public is based on the capture and analysis of the material. Capture may be accomplished through contact (e.g., wipe a surface or contact with a capture surface) or through capture from the atmosphere (e.g., forced air flow such as a "puffer" to dislodge particles from surfaces or through vapor sampling from the atmosphere).

Analysis in most current systems employs ion mobility spectroscopy as the mechanism for detecting items of interest. The detection capture and analysis devices may be installed in the infrastructure being protected such as at the portals for entry or exit, positioned to capture from the persons involved through contact (e.g., touch or swipe) or may be handheld and employed by those protecting the infrastructure. Such devices are common in airports today. The devices typically are slow in the capture and analysis process, frequently require operator participation and require regular cleaning, potentially after each use. In addition, the analysis results are frequently ambiguous, resulting in high false alarm rates.

An emerging class of detection devices relies on the capture of the threat indicating material causing a change in the composition of the material of the device which captures it. The change is then observable or causes a detectable change in the reflective photo luminescence. For example, film tags are used in nuclear facilities to determine if there has been exposure to radiation. Optical scanners may be employed to detect the change in luminescence when the capture material is presented. In cases where the change in the capture material is visible, the holder may dispose of the device before the capture event is recorded.

A number of detection technologies/systems exist in the marketplace, the majority of which are focused on explosives. The most publicized are the radio frequency based systems used by the military to detect improvised explosive devices (IEDs) and land mines at stand-off ranges, e.g. terahertz and magnetic resonance technologies. Vapor and particulate detection technologies are used in airports to screen airline passengers. Battery powered hand held sniffer devices are used by the military to screen individuals and suspected bomb making areas for detecting explosives. Most of the above systems are manually operated and/or monitored so as to evaluate each individual or situation being scanned at the time of interrogations.

There is central management of transit systems. Stations can be closed down when overcrowded. Sensors can determine the number of people likely to be on platforms. When crowds reach dangerous levels, access to the station can be shut down. Once crowds dissipate by boarding trains, the entry portals can be opened again.

BRIEF SUMMARY OF THE INVENTION

In one embodiment, a method and system for processing exposure to an item of interest in a transit system is disclosed. Detectors are sensitive to the item of interest such as chemicals, biologic compound, radiation, nuclear, and/or explosives to produce detector information. A threat assessment value is determined periodically. The fare media is read for card information, which can be used in addition to detector or other information. The assessment value along with the card information, detector information and/or other information is used in determining if an action is taken, for example, if a user can pass a portal to get access to the transit system.

In another embodiment, a transit system for processing exposure to an item of interest is disclosed. The transit system includes a number of detectors, a reader, an analysis subsystem, a station device and a portal. The number of detectors are sensitive to the item of interest that is one of a chemical, a biologic compound, radiation, nuclear, or an explosive. The plurality of detectors produce detection information indicative of the item of interest. The reader reads card information associated with a fare media. The analysis subsystem determines a threat assessment value for an event and communicates the threat assessment value to the station device. The station device that uses the threat assessment value and one or more of the card information or the detection information to determine if an action should be allowed when the event has occurred. The portal performs the action when the event has occurred.

In yet another embodiment, a method for operating a transit system to process exposure to an item of interest is disclosed. In one step, an item of interest is detected within the transit system. The item of interest is at least one of a chemical, a biologic compound, radiation, nuclear, or an explosive. Detection information indicative of the item of interest is produced. Card information is read from a fare media. A threat assessment value is determined remotely from a portal. It is determined if action by the portal should be performed based, at least in part, on the threat assessment value and the card information. The action is performed with the portal.

In still another embodiment, a transportation system for processing exposure to an item of interest is disclosed. The transportation system a detector, a reader, an analysis subsystem, and a station device. The detector is sensitive to the item of interest that is one of a chemical, a biologic compound, radiation, nuclear, or an explosive. The detector produces detection information indicative of the item of interest. The reader reads card information associated with a fare media. The analysis subsystem determines a threat assessment value for an event and communicates the threat assessment value to a station device. The station device uses the threat assessment value and one or more of the card information or detection information to determine if an action should be performed. The action is taken based upon the threat assessment value and the event occurring.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
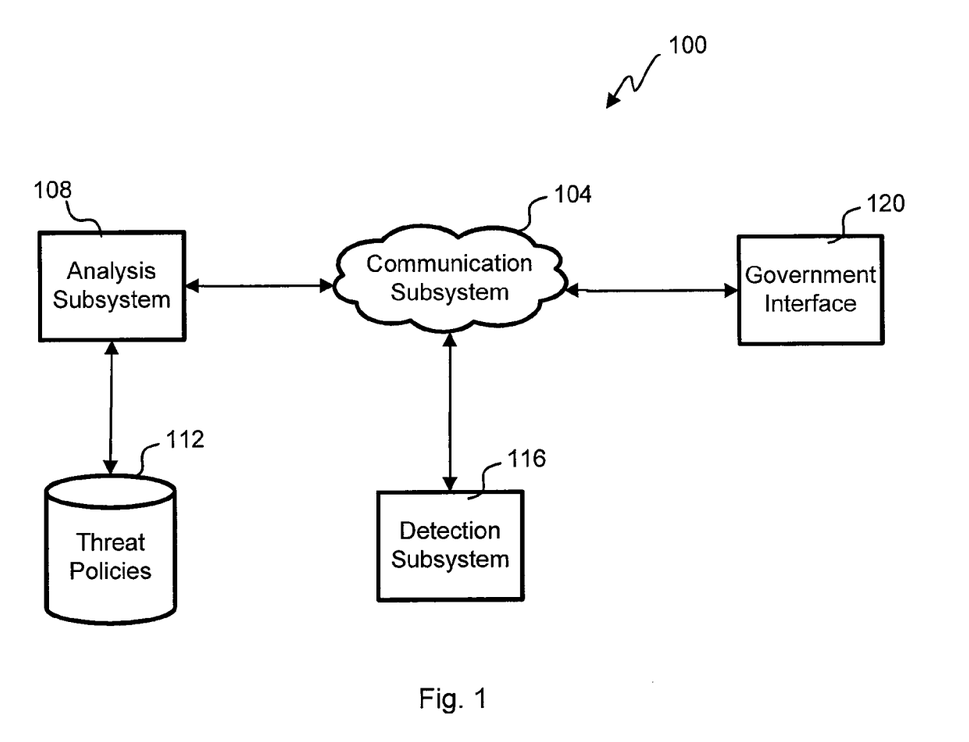
FIG. 1 depicts a diagram of an embodiment of a transit system at a conceptual level.

Referring initially to FIG. 1, an embodiment of a transit system 100 conceptually broken down into a detection subsystem 116, an analysis subsystem 108, threat policies 112 all tied together with a communication subsystem 104. The analysis subsystem 108 performs processing and analysis of all the information gathered by the detection subsystem 116. The threat policies 112 are designed to provide an associated "concept of operations" (CONOPS) that describes and governs how the transit system 100 operates.

The detection subsystem 116 integrates detection technologies capable of detecting and identifying trace particles or other indicators (e.g., radiation or other emanations) when employed in the transit or transportation environment. The detection subsystem 116 captures detector outputs with associated time of detection information that is captured, digitizes the information, records the information and forwards it for appropriate processing by the analysis subsystem 108. The detection subsystem 116 includes detector technologies embedded in the infrastructure of the transit system 100 as well as strategically located within or around the transit system infrastructure (e.g., hallways, buildings, track, etc.). The detection subsystem 116 includes the ability to detect chemical, biological, radiation, nuclear and/or explosive (CBRNE) threat materials or indicators of CBRNE as well as imaging sensors that, with appropriate processing, could provide indications of a potential threat through image recognition of persons and/or threatening objects.

The communications subsystem 104 connects the detection subsystem 116 to the analysis subsystem 108 and transfers the data and analysis results to the response resources consistent with the "rules" defined by the threat policies 112. The communications subsystem 104 also includes the communications capability which interconnects the distributed processors employed in the analysis subsystem 108. The communication subsystem 104 employs existing infrastructure, supplemented by commercial wireless capabilities with any combination of wide area networks (WAN), local area network (LAN), wireless WAN, and/or wireless LAN. Additionally free space optical communications could be used within the LAN. The communications subsystem is driven by the data volume generated by the detection system, the capacity required by the existing infrastructure (e.g., to support fare reconciliation, customer service, and other operations in a transit system), and response times established by the threat policies 112.

The analysis subsystem 108 includes local (stations and other facilities) and central processing systems supporting multiple applications which analyze the detector data, integrate associated data and information, assess threat risk and alternative responses and present the results (with recommendations) to the commanders responsible for managing the response, if any, through a government interface 120. Processors of the analysis subsystem 108 are linked in a distributed processing environment, facilitating shared information repositories, processing capacity and applications to implement the processing algorithms offer the results. The various processors have analysis applications which process detector data (may be associated in a dedicated processor at the detector), synthesize data (including comparisons with history and/or signatures) and fuse the resulting information with intelligence to provide the best available assessment of response options and projected risk. Results and associated recommendations may be based on the threat policies 112 to defined positions within the transit system 100 along with the government interface 120.

The government interface 120 allows interaction between the transit system 100 and governmental agencies. In some cases, different transit systems 100 can be tied together through the governmental interface 120. Some detected events may trigger the action of notifying governmental agencies for appropriate action. Additionally, detected events may cause adjacent transit systems 100 to react. For example, one transit system 100 may have a subway station in an airport. The transportation system that runs the airport could be notified that a detection occurred at the adjacent station of explosives or nuclear material. The airport transportation system would get information from the government interface 120 to take appropriate steps when such an event is reported.

The threat policies 112 and associated CONOPS are developed through an iterative process involving the management of the transportation or transit agency, the involved law enforcement resources, transit system personnel and patron representatives. The effort is to address physical constraints, operational alternatives and legal and moral obligations which define the transit agency policies. The threat policies 112 are then integrated with threat assessments, knowledge of available resources (with operational response times) and likely outcomes to formulate, document and implement processes that will manage the response in compliance with the policies and assessed "best" outcomes which define the CONOPS.

The detection subsystem 116 may include many detection sensors and devices within a given location or station to serve as a multi-level security shield. Each one of these detection devices is either complimentary or supportive of the other sensors to detect various threat potentials. In example, an explosives detection device may include multiple sensors, possibly working in conjunction with the radiation detection device(s), that provide data of significance communicated to the analysis subsystem 108 for near real-time analyzing. In addition, this information may be communicated to a gating portal to prevent entry into the transit system 100. The methodology used to analyze the detection device source data gathered by the detection subsystem 116 is made up of various elements and filtered and processed through a threat assessment algorithm run by the analysis subsystem 108. This algorithm is used with decision tree in one embodiment for denying access to the transit system or taking other action against a threat.

The transit system 100 accelerates the identification of CBRNE material by assessing the threat potential and fusing detection data and other available information or intelligence to increase confidence in the threat assessment using the analysis subsystem 108. Modeling and simulation is used to assess the consequences of an event to determine the priorities of resource allocation and the ability to prevent or contain the impact of the event. The data fusion of information from multiple threat detection devices providing source data that is combined with the transportation specific operating data such as: Fare Products, Time of Day, Ticket types, Purchase Methodology, Velocity Use, Event date and time, registered user information, route data and media type, etc.

The central or distributed processing of the operating data by the analysis subsystem 108 in conjunction with the various system threat devices is processed through a dynamic algorithm that provides an order of artificial intelligence or other algorithmic determination resulting in a learned predicted decision tree. In other words, a series of potential threat events combined with a certain behavior of the patron or usage patterns is processed to determine predictability of the actual event. Where the threat assessment value is communicated to the gate or fare-box, ticket vending machine or validator portal to gain transit system 100 entry. The processor or computer within the station or integrated within the actual portal device in combination with the user smart media, which is associated on card date or card identifier, being presented is used to determine the final risk assessment and the user or patron is either permitted to pass through or denied entry at the portal.

TABLE I

Threat Policies for Events used by Dynamic Predictability Algorithm

| Event | User Info | Agency Ops | Threat Detection | Media |
|---|---|---|---|---|
| 001 | Un-Registered | Route 06, (Remote) | Low level detection | Paper Ticket |
| 002 | Un-Registered | Route 01, Downtown Connection | Moderate or elevated detection | Disposable Limited Use Ticket |
| 003 | Registered | Transfer Station | No detection | Smart Card |
| 004 | Any | System Wide | Homeland Security Alert Level High | All |
| 005 | Any | System Wide | Homeland Security Alert Level Severe | All |
| 006 | Any | Any Station | Radiation & Explosive | Any |
| 007 | Any | Any Station | Fleeing Terrorist Nearby | Any |
| 008 | Any | Any Station | Terrorist Identified | Any |
| 009 | Any | Downtown Stations | Threat Assessment Level Above 80% | Any |
| 010 | Any | Station at Intersection of Routes | Moderate or elevated detection at two stations | Any |
| 011 | ID: 6792312A | System Wide | Any encounter | Contactless Smart Card |
| 00N | Registered | Route 102, Commuter Rail (inbound) | Low Detection | Smart Card |

Where the determine predictability algorithm is continually processing completed transaction events with and without actual threat alarms to dynamically modify what determines the latest threat assessment value and action for the various events. In others terms, the dynamic predictability algorithm is learning normal travel patterns and use behavior in a particular station, for various patrons and through a number of stations to determine what is likely to constitutes a real threat. Table I shows a small sample of threat policies 112 used by the dynamic predictability algorithm to produce a threat assessment value and action to take as shown in Table II.

The sum total of the interaction of the threat policies and the actions when implicated define the CONOPS. By adjustment of the threat policies, the actions can be triggered more easily. In some cases, certain events can raise the index of the whole system. For example, a Homeland Security threat level of severe would add to index for each station by 50 points. A particular station may have a threshold of 75% before action is considered. Other events are more likely to trigger the threshold for the station when the quiescent index for the station is raised by a threat level event of severe.

Each station can have is own quiescent index level. Proximity of event to attractive targets, frequency of false alarms, background detection levels, and other considerations can all be used to set the bias or quiescent index level. For example, the subway station nearest the White House in Washington, D.C. could have a quiescent index level of 40%, while a suburban subway station near farming communities could have a quiescent index level of 0%. In this example, events in the station near the White House would be more likely to trigger action than an event at the suburban subway station. Rather than changing the quiescent index level, other embodiments could adjust the threshold for triggering action differently for various locations.

The threat policies and the threat assessment values can be adjusted to cause any action to address a particular circumstance. In table II, certain actions are marked with an asterisk to denote those actions that can be engaged automatically. Automatic actions include a portal that denies entry, closing one portal of several portals, closing all entry and/or exit portals, slowing down the flow of patrons through the portals, and monitoring and recording of audio/video and sensor readings. Manual actions include dispensing police and military forces, closing down a station, causing vehicles to stop, causing vehicles to avoid new passengers, causing vehicles to avoid exit of passengers, service announcements, etc. What is done automatically or with manual oversight can be adjusted by changing the threat policies and actions associate therewith.

Some embodiments can automatically slow down the rate that traffic flows through the portals as one possible action. The extra time afforded by slowing down admittance through the portals can be used by the analysis subsystem 108 to scrutinize a patron and their fare media more closely. Some embodiments have the portals making decisions without the benefit of remote information, but here, information maintained centrally could be used to make decisions and take action.

For the actions without the asterisk, a human operator in a control center would be alerted of the decision to optionally perform the indicated action. For example, event 010 occurs when two patrons are detected with a similar or complementary item of interest near the same time. A human operator would be notified of this situation and be given the option of avoiding contact between the two individuals. This could be done, for example, by having one train not stop at the point where the two routes intersect.

TABLE II

Detection Index for Dynamic Threat Prediction

| Event | Threat Assessment Value | Action |
| --- | --- | --- |
| 001 | 35% | Monitor & Record* |
| 002 | 80% | Immediate Portal Denial* |
| 003 | 05% | No Action |
| 004 | 25% | Monitor & Record* |
| 005 | 50% | Close Station (Deny Entry & Allow Exit) |
| 006 | 95% | Close Station & Line |
| 007 | 70% | Permit Entry, Deny Exit & Train Avoids Stopping |
| 008 | 80% | Lock-down Station (Deny Entry & Exit) |
| 009 | — | Police Called to Affected Station(s) |
| 010 | 60% | Train Avoids Mixing Passengers from Routes |
| 011 | 100% | Track & Detain Patron |
| 00N | 15% | No Action |

Figure 2:
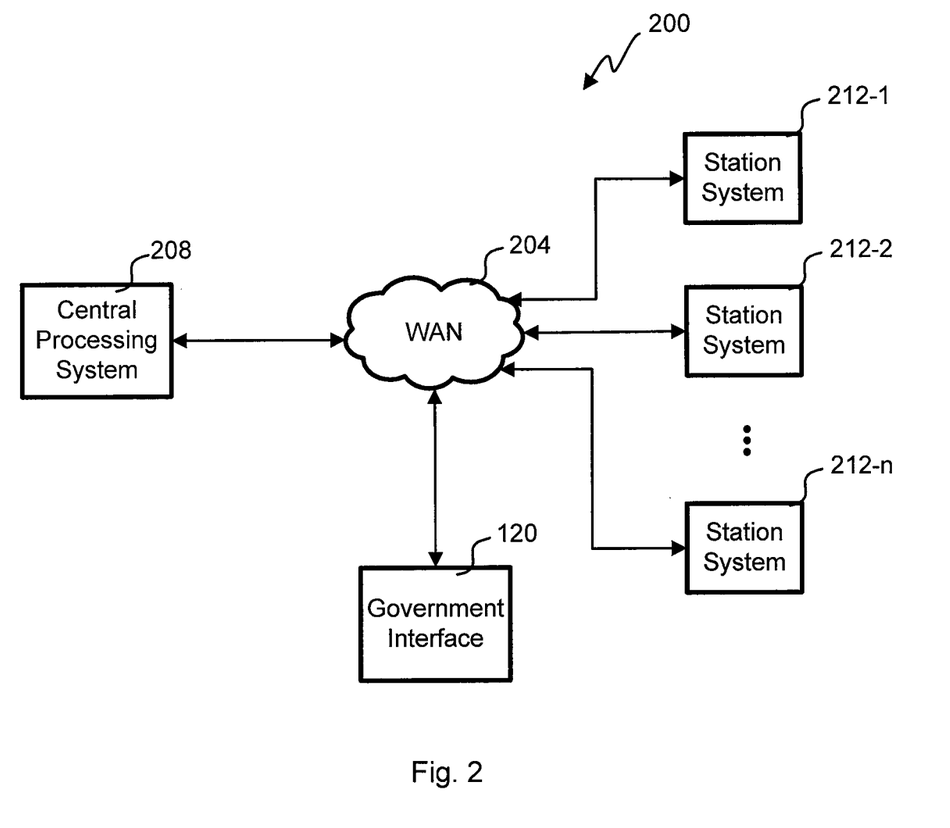
FIG. 2 depicts a block diagram of an embodiment of the transit system.

With reference to FIG. 2, a block diagram of an embodiment of a transit system 200 is depicted. A number of station systems 212 are distributed with the various stations in the transit system 200. A WAN 204 allows communication within various locations within the transit system 200. For example, a first station system 212-1 can communicate with a central processing system 208 using the WAN 204. This embodiment has a single central processing system 208, but other embodiments could have multiple central processing systems 208 that each process information from multiple station systems 212. The central processing system 208 could be co-located with one station system 212 or remote to all station systems 212.

A government interface 120 allows entry of threat policies 112 and their modification. Security in the government interface 120 allows only authorized members of the transit authority and government to access the transit system 200. Status information can be provided through the government interface 120, such as current threats, transit system usage, information on patrons and/or fare cards, detection of items of interest, video and audio streams, etc. Additionally, the government interface can receive and send information that ties together the transit system 200 with other transit systems or other systems. For example, a subway stop near an airport may share information with a transportation system within the airport such that threats can be contiguously managed in one embodiment.

Figure 3:
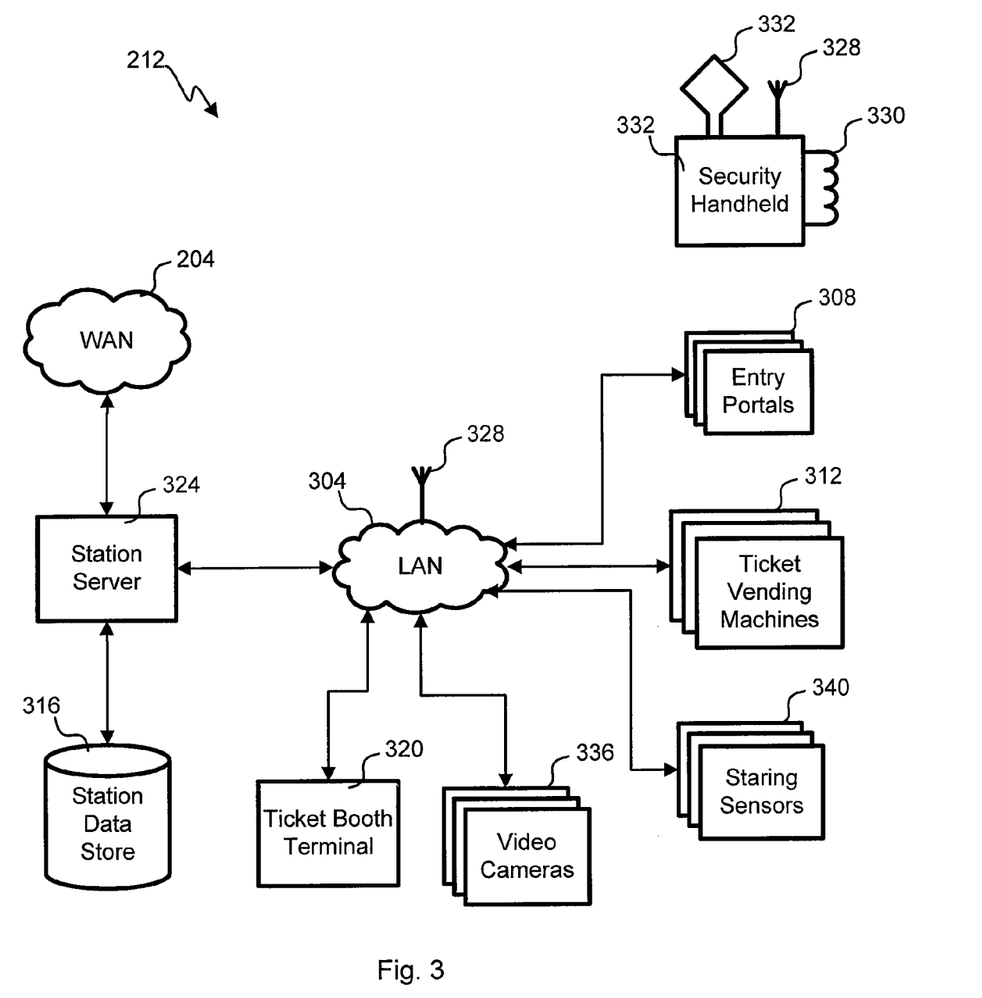
FIG. 3 depicts a block diagram of an embodiment of a station system.

Referring next to FIG. 3, a block diagram of an embodiment of a station system 212 is shown. The station system 212 is typical of components found in a station of a transit system 200. A station server 324 communicates with other station systems 212 and the central processing system 208 using the WAN 204. A station data store 316 can store events that occur in the station, video and audio surveillance and/or the detection index for dynamic threat prediction. Events could be detector readings, fare media interaction, patron interaction, transportation vehicle movement, etc. The event information is accessible to the central processing system 208 via the WAN 204 in running the dynamic predictability algorithm.

A LAN 304 uses wired and wireless media to communicate with various components in the station system 212. The wireless media is accessed with antennas 328 distributed around the station and coupled to an antenna 328 on one or more security handhelds 332. The security handheld can read contactless smart cards by activating them with a coil 330. Other contactless smart card readers could be integrated into entry portals 308, ticket vending machines 312, a ticket booth terminal 320, and possibly other locations in the station system 212.

Entry portals 308 potentially limit access to the transit system 200. These entry portals 308 could be to access employee only areas and/or places where the transportation vehicles can be accessed. One type of entry portal is a fare gate, which has a fare card reader, a turnstile to prevent or allow access and a processor. The processor analyzes the detection index that includes events and their threat assessment value and action to take. The detection index is determined away from the station in this embodiment. The threat assessment value along with detector readings and/or information from the fare media is used by the portal to decide if the suggested action for the event should be taken. The entry portal makes this determination without gathering remote information. The predetermined threat assessment value is used along with information gathered from the fare card and/or detection sensor information by the entry portal 308.

A ticket booth terminal is used by a ticket booth operator to override problems, monitor station systems, sell and recharge fare media, and/or provide observations of the station. A fare card reader could be integral to the ticket booth terminal. Additionally, the ticket booth terminal 300 could include CBRNE detectors that read the fare media or sense exposure by patrons. The ticket booth operator can identify suspicious events, patrons and other circumstances that could modify threat assessment values or their associated actions.

Video cameras 336 are distributed around the station. Audio information could alternatively or supplementally gathered for surveillance in some embodiments. The timing of the surveillance can be correlated with CBRNE detector events. After the detector events, the surveillance information can be gathered for analysis.

Staring sensors 340 can be distributed about the station to sense CBRNE items of interest. Plumes from patrons, contact with patrons and background readings can all be sensed by various staring sensors 340. The transit system personnel can periodically check operation of the staring sensors 340 and prevent that information from feeding back into the dynamic predictability algorithm.

Patrons can purchase and refill fare media using the ticket vending machines 312. Additionally contact with the ticket vending machines 312 can be used to determine if the patron has been in contact with CBRNE and trigger the appropriate event. The fare media can be analyzed to determine if it has been exposed to CBRNE. Electronic smell sensors, spectroscopy of the media, and/or color reactive media could be used to allow the ticket vending machine 312 to find threats. Some embodiments embed detectors into the fare media itself as further described below.

When a portal 308 or ticket vending machine 312 reads a particular fare media, information memorializing detection can be written to the fare media itself. For example, when a ticket vending machine 312 senses a plume off a patron of explosives, that event could be communicated to the central processing system 208 and recorded to the fare media. When encountered later, the event can be read from the fare media or it could have already communicated by the central processing system 208. Some embodiments do not write to the fare media a particular event, but get that information from the central processing system 208 periodically or upon request when a particular fare media is encountered.

Figure 4:
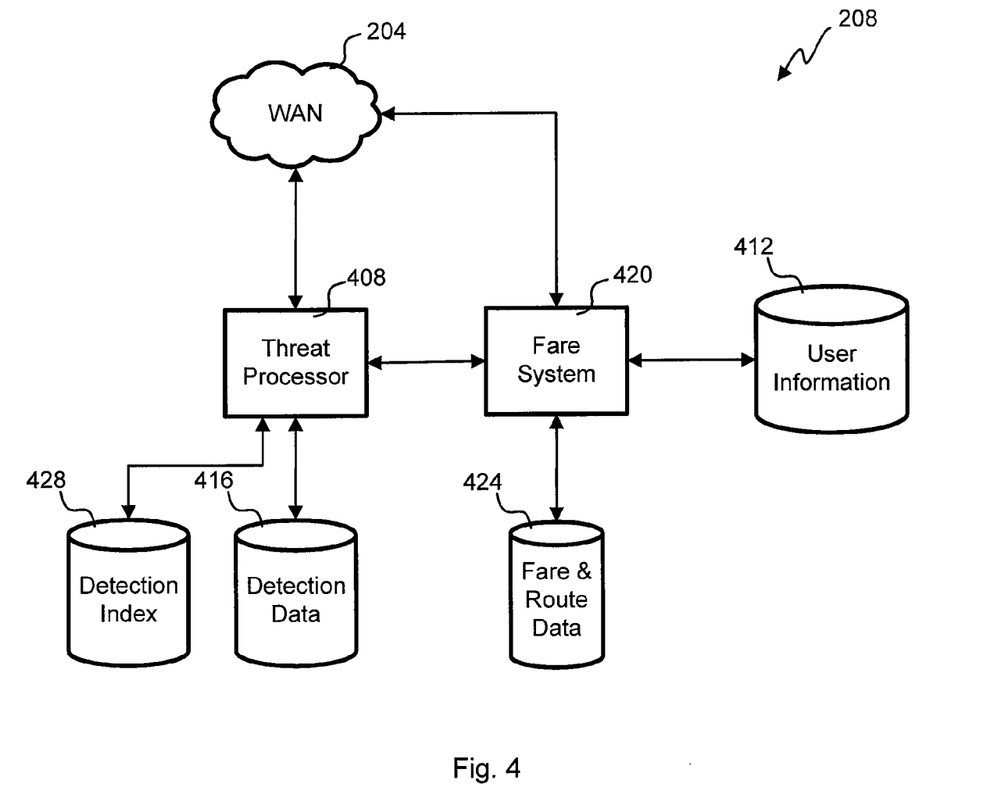
FIG. 4 depicts a block diagram of an embodiment of a central processing system.

With reference to FIG. 4, a block diagram of an embodiment of a central processing system 208 is shown. A fare system 420 is used to operate the transit system 200. User information 412 includes fare media credit and/or patron information, where available. The fare system 420 has access to fare and route data 424 used to price fares, route, track vehicles, etc. The fare system 420 gathers information from station systems 212 using the WAN 204. The fare system 420 interacts with a threat processor 408 to provide the user information 412 and the fare and route data 424 for the dynamic predictable algorithm.

The threat processor 408 performs the dynamic predictability algorithm with information from the fare system along with detection data 416. Information from all the station data stores 316 is gathered and accumulated in a detection data store 416. The threat policies entered are also stored in the detection data store 416 in this embodiment. The threat processor 408 is observing actions system-wide to determine a detection index 428. The detection index 428 defines a number of events, a threat assessment value associated to each event, and an action to take if the portal determines to activate the action.

Figure 5:
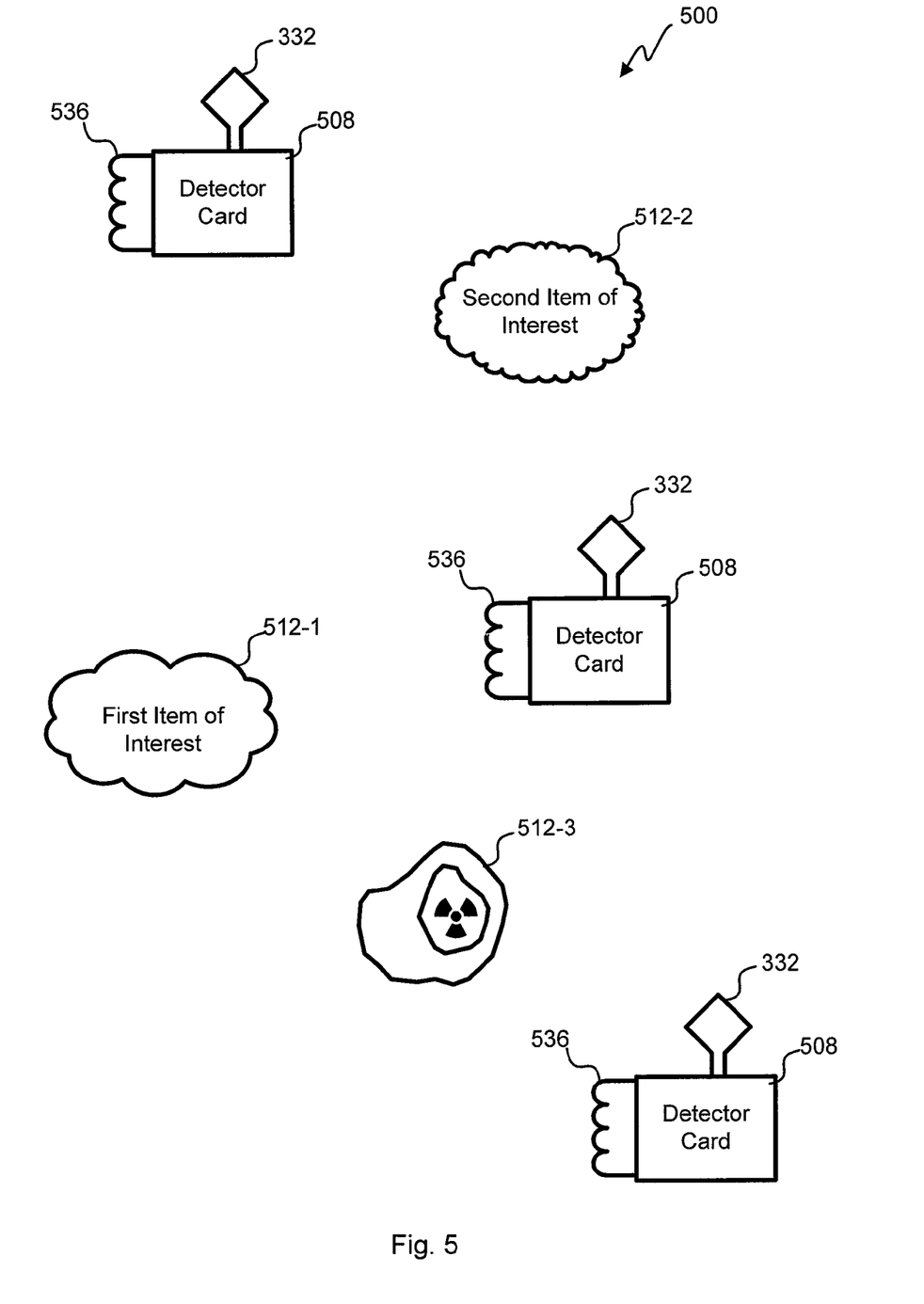
FIG. 5 depicts a block diagram of an embodiment of a detection system in an environment of items of interest.

Referring to FIG. 5, a block diagram of an embodiment of a detection system 500 in an environment of items of interest 512 is shown. This embodiment has several detector cards or media 508 that each communicate with an antenna 332 and receive power inductively through a coil 330. The detector media 508 are exposed to various items of interest 512 as they travel with an associated patron. The detector media 508 are capable of sensing exposure to one or more items of interest, even when the coil 330 is not receiving power from a reader. Any exposure can be communicated to a reader when the detector media 508 is activated.

The detector cards or media 508 communicate with readers using wireless radio frequencies (RF), for example, 13.56 MHz or higher frequency signals could be used. The detector card 508 or token could be used as a smartcard for other purposes. For example, the detector card 508 could be used for access into a system such as, public transportation systems, automated parking systems, stadium event ticketing systems or building access systems. Additionally, the detector card 508 could be part of a phone or credit or debit card. The detector media 508 need not be in card form and can be any type of RF identification (RFID).

At any time, a reader can wirelessly power a detection media 508 and communicate with the detector media 508 within communication range. Readers could be handheld or fixed, but can read any detection information from nearby detector media 508 at a distance. The reader uses a coil 330 to send power to the detector media 508. An antenna 530 of the reader 504 is used to communicate with the detector media 508.

Various items of interest 512 can be sensed by the detector card 508. The items of interest could be CBRNE, for example. As the detector card 508 is carried by the user, any exposure to these items of interest 512 can be sensed and that information retained in some manner until a reader 504 reads the information. The item of interest may be directly transferred by contact or indirectly without any contact.

Although this embodiment uses fare media with detection polymers, a transit system could use other fare media or a mix of different types of fare media. There could be magnetic stripe fare cards, optically encoded fare cards, contactless or wireless smart cards, smart cards with contacts, etc. A given transit system typically uses two different types of fare cards. Some registered fare cards are tied to patron identity, payment information, government issued identification, photograph, and/or demographic information. Unregistered fare cards can be tracked as they are used throughout the system, but identity is not known and are more likely to be passed between different patrons.

Additionally, the fare media could be registered or unregistered to a patron. Registered fare media allows the transit system to know something about the patron such as name, payment information and other demographic information. Knowing identity allows some risk assessment when the registered fare media is encountered. It also is more likely the patron is actually using the fare media when it is presented rather than someone who borrowed the fare media. With unregistered fare media, the correlation could be to a single unknown patron or could be passed around more easily.

Figure 6:
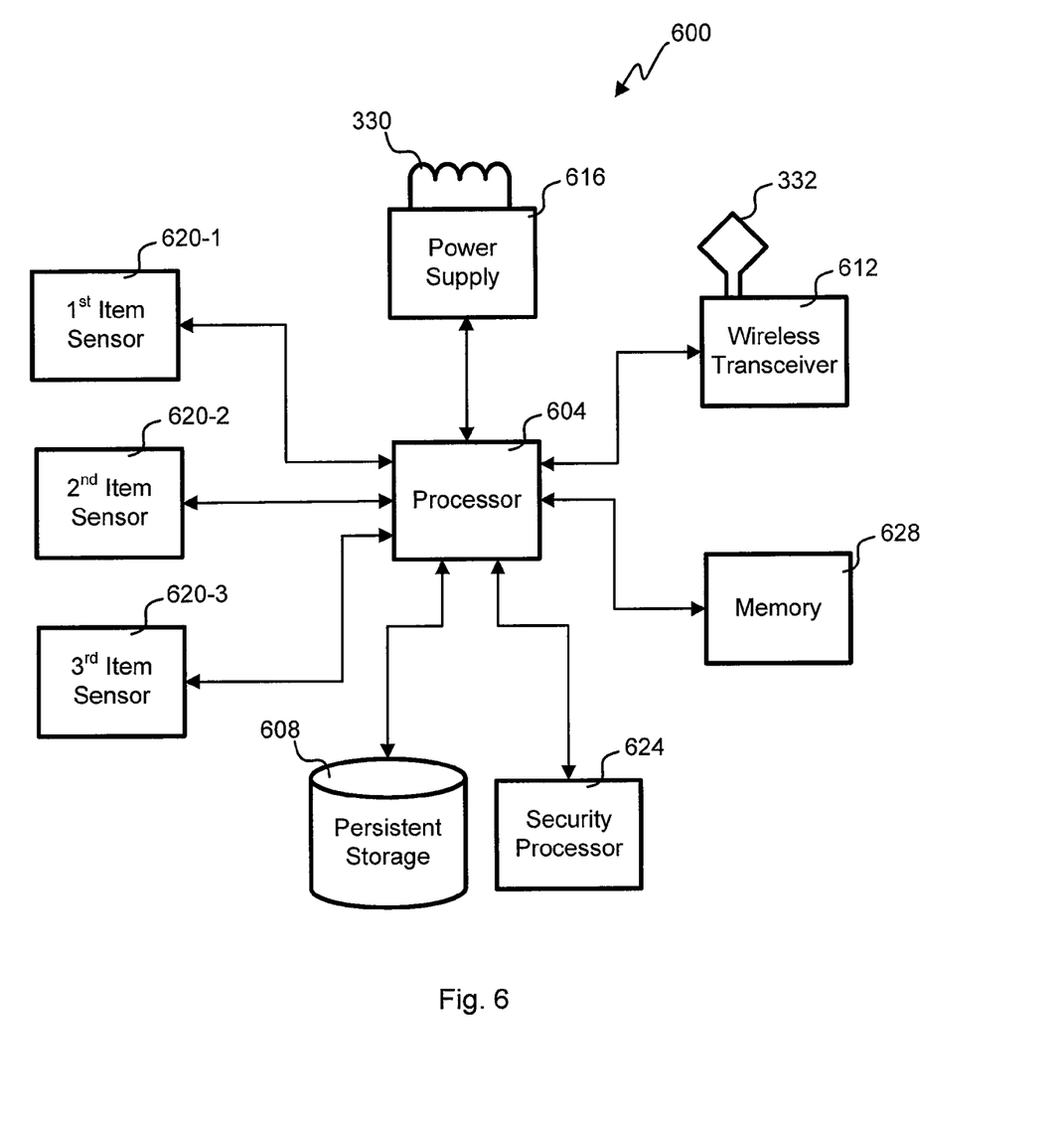
FIG. 6 depicts a block diagrams of an embodiments of a wireless detector circuit.

With reference to FIG. 6, a block diagram of an embodiment of a wireless detector circuit 600 is shown. The detector circuit 600 is embedded in a detector card in this embodiment, but could be embedded into anything in other embodiments. A processor 604 or microcontroller runs software using the memory 628. The software can be held in the persistent storage 608 such as flash, ROM or some other non-volatile memory. The persistent storage 608 can be used to store identifiers for the wireless detector circuit 600 and sensor readings. Various amounts of historical sensor readings can also be stored in the persistent storage 608.

This embodiment of the wireless detector circuit 600 uses a smartcard. A security processor 624 can be used for authentication, authorization or secure storage of information. Other embodiments could be used for no more than sensing items of interest without the other smartcard functionality. Some embodiments could have a separate wired or wireless smartcard circuit completely separate from the detection circuitry rather than integrating the two functions as in this embodiment.

A wireless transceiver 612 allows bi-directional communication with the wireless detector circuit 600. The antenna 332 is used for this communication. Other embodiments could have multiple transceivers and antenna tuned to other frequencies and/or configured to work with other standards. Some embodiments could have only transmission capability in the wireless detector circuit 600.

A power supply 616 allows intermittent energy supply to the wireless detector circuit 600. When in range with a reader, energy is coupled to the coil 330 and converted into appropriate voltages by the power supply 616. The wireless detector circuit 600 becomes fully functional when properly energized by the reader.

This embodiment has passive sensors that do not require power to record exposure to items of interest. For example, fluorescent quenching polymers or molecularly imprinted polymer (MIP) technology can report detection of a substance that has come in contact with the item sensor 620 when the wireless detector circuit 600 is in an powered or non-powered state. The item sensor 620 can read a chemical, physical, or electronic change in the MIP. The change signifies that a detection of a target substance or substances has occurred. Each item sensor 620 can be configured to be sensitive to one or more compounds or conditions.

When the wireless detector circuit 600 is next powered, the exposure of the detection polymer can be recorded in the persistent storage 608 as exposure information. The value of the exposure information can be a value indicative of the amount of exposure experienced. The characteristics of the detection polymer can be such that the resistance (or some other electrically readable characteristic) changes as a function of exposure.

Although this embodiment uses polymers for detection, other embodiments could use silicon sensors. A battery could be integrated into the wireless detector circuit to power the silicon sensors when no energy is coupled in through the couple. Some embodiments could use a combination of silicon and polymer sensors.

Figure 7A:
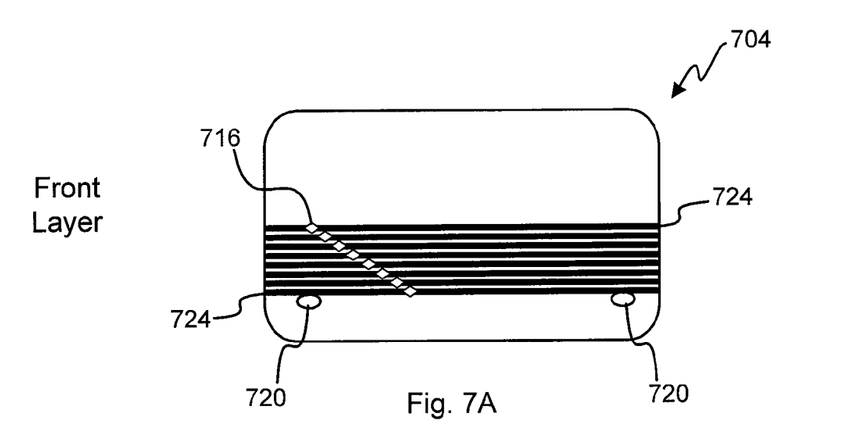
FIGS. 7A, 7B and 7C depict a structural diagram of an embodiment of the detector card having three layers of construction.
Figure 7B:
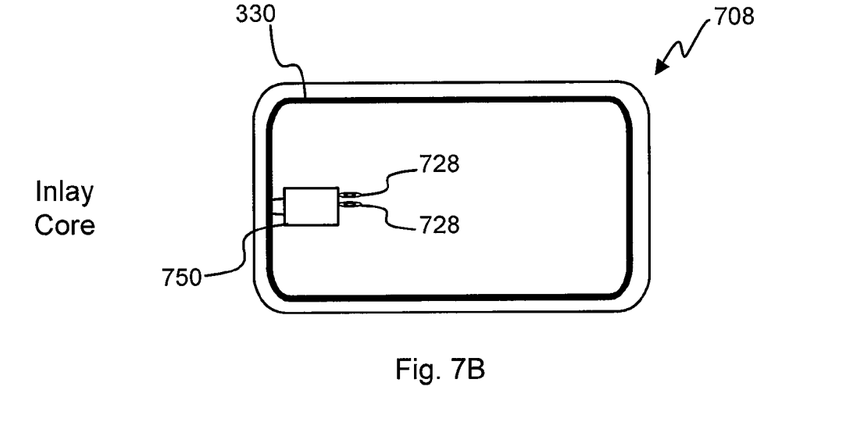
Figure 7C:
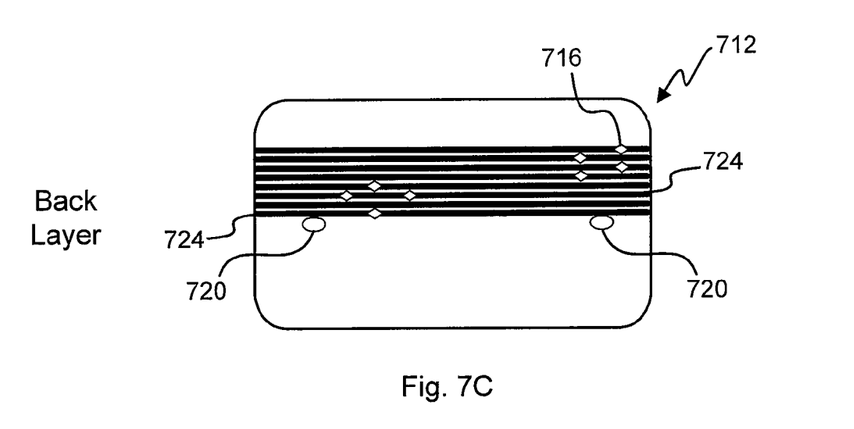

Referring next to FIGS. 7A, 7B and 7C, a structural diagram of an embodiment of the detector card 508 having three layers of construction is shown. The configuration can be changed dependent upon the requirements of the media that the polymers will be embedded and the ergonomics of the device to enhance detection from the expected handling of the detector card. Front and back layers 704, 712 are made of a plastic, plasticized, polyvinyl or paper material in which various layers of amalgamated, aggregated, or conjunctively combined conductive polymers 720 and detection polymers 724 are applied in an interlaced or checkered pattern, for example. This pattern can vary with ergonomic requirements.

Each of these detection polymer stripes 724 are integrated with a sensor 716 that transfers the conductivity change in value to the inner layer or inlay core 708 using sensor connection points 728. The inlay core 708 processes the sensor information and acts as a transmitter to either the integrated circuit (IC) 750 or printed circuit (PC) contact point, which could include the use of the existing antenna inputs. A method of detuning the antenna may be implemented as well when the detection polymer changes in characteristics due to a threat substance exposure. The change in characteristics of the detection polymer may be inductive, voltage, resistance, and conductive and/or magnetic in nature.

The IC or PC 750 will evaluate the change in input characteristics during and when a detection change occurs, or simply reacts to the change in antenna Q factor and or both to trigger the IC or PC 750 to take the appropriate action to signal that a detection occurrence took place. In turn, the smartcard reader interrupts this change in signal detection and transmits or sends the appropriate information to the host processing system for a valid response.

One embodiment of the detector card 508 detects the presence of chemical and eventually biological (explosive) compounds on contactless smart cards/tickets when they are presented at transit fare gates/bus fare boxes, parking lots, other designated entry/exit points or any other location equipped with smart card readers (e.g., hand held card readers). This embodiment integrates chemical sensing compounds (polymer) into smart card structures. This can be covertly or visibly accomplished.

Amalgamated or conjugated polymer detects presence of explosive compound residues without requiring a bulk quantity. Chemical reaction occurs when explosive residue comes in contact with a conjugated polymer. In one embodiment, chemical reactions are automatic, cumulative and/or non-erasable. Semi-conducting properties and features of conjugated polymer allow chemical reactions to generate electrical signals when interrogated. Chemical reactions and status of subsequent interrogation are not evident to smart card/badge users in an embodiment.

The amalgamated or conjugated polymer is insensitive to the transit environment or other interferences. Interrogation of smart card detection status does not require any changes in transit operations or passenger inconvenience. Transit passengers do not have to openly display their smart card 508 to the smart card reader as it can remain in a wallets, purses, etc. as is normally done. Detection and interrogation process can be done without requiring human intervention. The entire detection and interrogation process is automatic and stealth in operation.

In one embodiment, a chemiselective or detection polymer captures trace particles or emanations from a specific threat compound. A conductive polymer senses the change in a characteristic of the detection polymer after the capture of the target particle or emanation. The exposure information is transferred to the electronic circuit embedded in the smartcard or token. The electronic circuit wirelessly communicates with a reader in a manner consistent with the present or future reader standards.

In another embodiment, a smartcard or smart token is used for access control or security systems operating at 13.56 MHz or higher with the ability to detect and report trace CBRE material that has been in contact with the smartcard or token. Other embodiments could use any monetary instrument, ticket, card, contactless, RFID, or token used for access and/or payment. When the card communicates with any type of Automatic Fare Collection system such as those found in, public transportation systems, automated parking systems, stadium event ticketing systems or building access systems, the trace detection status of what has come in contact with the smartcard is reported through the infrastructure in order to provide detection, intelligence gathering information, and prevention of terrorist incidents. This information may be used for intelligence collection into a special situational awareness software program or interface into a command and control (C2) or communication, command and control (C3) system.

A smartcard, token or portable detector using a polymer sensor technology, such as but not limited to, fluorescent quenching or molecularly imprinted polymer (MIP) technology that can register detection of a substance that has come in contact with the card or token when in an powered or non-powered state. These technologies interact with an additional conductive polymer and/or nanotechnology layer(s). The detection polymer and the conductive polymer or nanotechnology may be amalgamated or conjunctively combined. When the detection polymer is contaminated with item of interest, it interacts with the other polymer materials, and a signal is generated and relayed to a microprocessor or memory cell located in a smartcard. The interaction can be through a chemical, physical, or electronic change. The change signifies that a detection of a target substance or substances has occurred. The detection event triggers changes in an electrical or data characteristic of the smartcard that corresponds to the specific sensors targeted triggering substance. Each card can have one or many detection sensor inputs and can be configurable to accept combinations of any CBRNE substances.

The detector card or token has two basic configurations, one which incorporates an integral power source and the second which is powered when it is placed within the electromagnetic field generated by a reader. Each configuration has the ability to detect trace materials (vapors, emanations or particles) associated with a known compound that is or may be representative of an item of interest. Embodiments of the invention detect the trace material(s) and report it wirelessly to the reader to deter, prevent or contain the potential threat should it be validated. In addition to being able to detect the item of interest, some embodiments also provide an indication of the volume or strength of trace materials detected.

Detection polymers exist for most explosive and chemical threat agents. Additionally, materials can capture radiation emanations and polymers for biological material. Embodiments of the invention can contain one or multiple polymers for detection (e.g., fluorescent quenching or MIP) and one or multiple polymers and nanotechnologies for conducting signals to the electronic circuitry. These two types of polymers can be amalgamated or conjunctively joined into a card substrate. Carbon nanotubes and other nanotechnology can be used for printed electronic circuits and to interface with the conducting polymer. The application of the polymers, combined in either a mixed or a layered scheme can be applied using multiple methods, as a polymer/nanotech ink, using a spray method, brushing, spin-coating, printing, and/or roller-coating. Ink jet printing technology can be used, for example, to spray apply the polymer(s) and form nanotech circuits on or in the surface or substrate materials. This embodiment is in the form of a smartcard that transfers the detection event data to the reader employing standard smartcard communication methods.

A smartcard is used by individuals in a number of applications that are germane to this invention. A smartcard may be of a contact or contactless type in various embodiments. In a contact type, the chip is read when physical contact is made on the electrical interface pads for the chip. A contactless card is read wirelessly at a distance. Some embodiments could have multiple wired or wireless smartcard circuit completely separate from the detection circuitry rather than integrating the two functions as in this embodiment. An embodiment can be a smartcard with a built-in battery. The detector card may be a token or credential (e.g., badge, ID card, license, etc.), a bank card (e.g., credit, debit, stored value, etc.), or a preferred customer or member card or a prepaid card for other economic applications (e.g., transit system fares, NFC enabled cellular phone, prepaid gift cards, etc.). The detector card or media fits within the palm of a human hand, but other embodiments could be less than 10, 8, 6, 5, 4, 3, 2, or 1 in$^2$ and thinner than 10, 8, 6, 5, 4, 3, 2, or 1 mm.

Currently available are a class of conductive polymers that have conductivity levels between those of semiconductors and metals. Until recently, these conductive polymers did not have sufficient conductive properties to be utilized in manner of this invention. Conductive polymers, such as but not limited to, the highly conductive Clevios™ series available HS Starck™ that provides the base material for an electrical conversion for the detection polymer (e.g., MIP).

The combination of the detection polymer with a conductive polymer provides the basic component used in a sensor that can detect and have an electrical property change that can be electronically relayed. The combination of the two polymers is performed as an amalgamated polymer or a conjunctively combined polymer. The currently commercially available conductive polymers have a conductivity rating up to 1500 ohms/cm$^2$ that allows for an electromagnetic field to provide enough induced power to quantify an electrical characteristic change in the detection polymer. This change will occur when the detection polymer moves from an uncontaminated to a contaminated state.

Nanotechnology techniques, such as but not limited to, carbon nanotubes, can be used to form the circuit that can discriminate the signals generated from the contaminated detection polymers. The electrical signals can be developed through changes in inductive coupling, capacitive coupling, magnetic coupling or resistivity.

Figure 8:
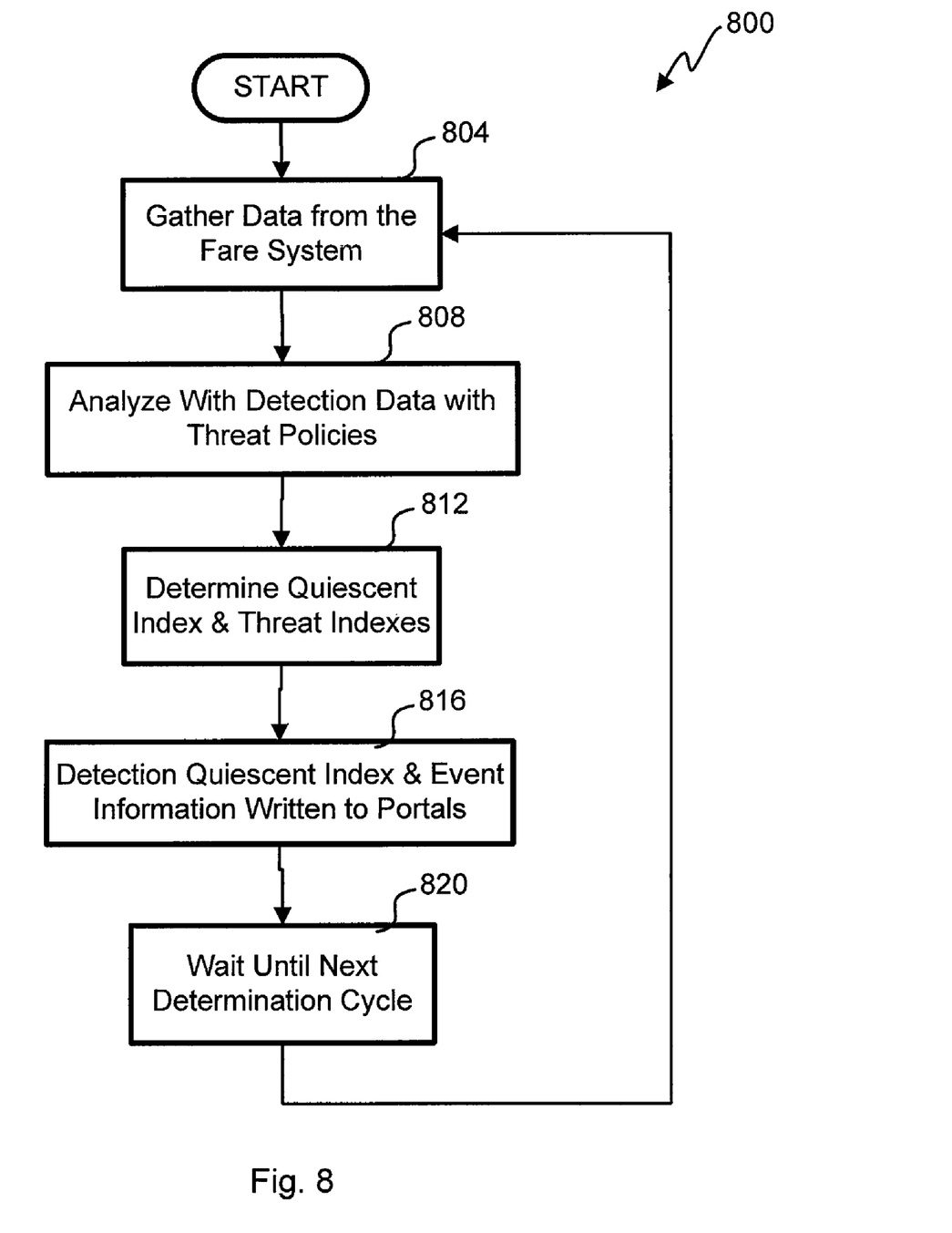
FIG. 8 depicts a flow diagram of an embodiment of a process for operating a dynamic predictability algorithm to produce a threat assessment index and hotlist events.

Referring next to FIG. 8, a flow diagram of an embodiment of a process 800 for operating a dynamic predictability algorithm to produce a threat assessment index and hotlist events is shown. In block 804, data is gathered from the fare system 420 relating to the fare cards, patrons, routes, etc. The fare system information is analyzed with CBRNE detection data, known threats, and background events according to the threat policies in block 808. For example, this process can filter out normal background levels of CBRNE at locations and along routes.

The a quiescent index for each location or station is formulated along with a threat assessment value or index for the various events in block 812. The quiescent index and relevant portions of the detection index for each event are written to all the entry portals 308 in block 816. The process is repeated after some optional wait in block 820 such that the predictability algorithm is dynamically updated according to any frequency as the fare system and detection information updates over time.

Figure 9:
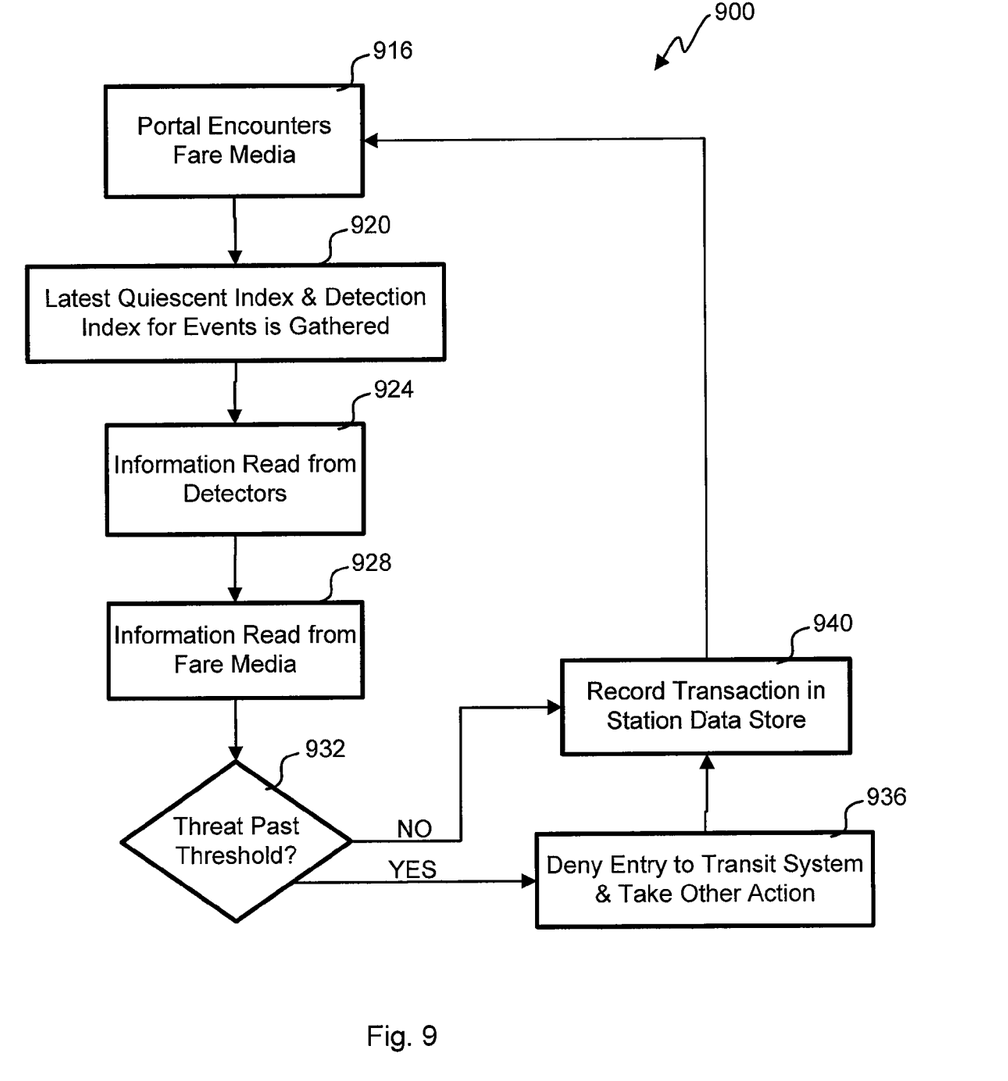
FIG. 9 depicts a flow diagram of an embodiment of a process for operating a portal is shown.

With reference to FIG. 9, a flow diagram of an embodiment of a process 900 for operating a portal 308 is shown. The depicted portion of the process begins in block 916 where a particular entry portal 308 encounters a fare media. The current detection index for various events along with the quiescent index are read from the entry portal 308 or another location nearby in block 920 such as within the station system 212. The CBRNE detector(s) is read if not done already in block 924 to get staring readings, transfer from the patron, transfer from the fare media, a plume from the patron, or historical detection readings from the fare media. Information is read from the fare media in block 928. The fare media has a unique identifier that could be flagged as an event and/or a event number could be written to the fare media.

All the events that the particular entry request qualifies for are totaled. For example, one event might have an index of 10%, another an index of 50% and another an index of 5% for a total index of 65%. Any quiescent index would be added to the total index. If the threshold were currently set at 62% as determined in block 932, the actions defined by these events would be taken by the entry portal in block 936 before going to block 940 to record the result. Where the threshold is not exceeded as determined in block 932, the specified action in the entries is taken before the transaction is recorded in the station data store 316 in block 940. Processing loops back to block 916 to process the next fare card.

A number of variations and modifications of the disclosed embodiments can also be used. For example, the current disclosure describes physical access control into rail and bus transit and parking systems. Other applications include passenger entry/exit at airports (tickets), employee entry/exit at airports (badges), passenger entry/exit at airplanes (tickets), border entry/exit (ID Cards), military base entry/exit (badges), contractor entry/exit (badges), sporting events (employees and attendees), and badge/tickets, concerts, and business meetings.

While the principles of the disclosure have been described above in connection with specific apparatuses and methods, it is to be clearly understood that this description is made only by way of example and not as limitation on the scope of the disclosure.

What is claimed is:

1. A transit system for processing exposure to an item of interest, the transit system comprising:
   a plurality of detectors sensitive to the item of interest, wherein:
      the item of interest is one of a chemical, a biologic compound, radiation, or an explosive, and
      the plurality of detectors produce detection information indicative of the item of interest;
   a reader that uses at least one of a radio frequency identification (RFID), optical, or magnetic interface to read card information associated with a fare media;
   an analysis subsystem that:
      determines a threat assessment value for an event based, at least in part, on a purchase of the fare media, including at least one of:
         a purchased fare product type,
         a ticket type, or
         a purchase methodology;
         wherein an identity of a user of the fare media is unknown; and
      communicates the threat assessment value to a station device;
   the station device that uses the threat assessment value and one or more of the card information or the detection information to determine if an action should be allowed when the event has occurred; and
   a portal that performs the action when the event has occurred, wherein the portal includes at least one of:
      a fare gate,
      a validator, or
      a fare box.

2. The transit system for processing exposure to the item of interest as recited in claim 1, wherein the action automatically denies passage of a patron associated with the fare media.

3. The transit system for processing exposure to the item of interest as recited in claim 1, wherein the threat assessment value is a function of a threat policy and fare system information.

4. The transit system for processing exposure to the item of interest as recited in claim 1, wherein the plurality of detectors comprises molecularly imprinted polymer(s) and are embodied in the fare media.

5. The transit system for processing exposure to the item of interest as recited in claim 4, wherein the detection information is determined from a chemical, physical, or electronic change in at least one detector of the plurality of detectors.

6. The transit system for processing exposure to the item of interest as recited in claim 1, wherein the fare media includes a detector from the plurality of detectors.

7. The transit system for processing exposure to the item of interest as recited in claim 1, wherein the threat assessment value is determined at a location remote from the portal.

8. The transit system for processing exposure to the item of interest as recited in claim 1, wherein the fare media is a contactless smart card.

9. The transit system for processing exposure to the item of interest as recited in claim 1, wherein the portal, station device and reader are part of a fare gate.

10. A method for operating a transit system to process exposure to an item of interest, the method comprising:
   detecting an item of interest within the transit system, wherein the item of interest is at least one of a chemical, a biologic compound, radiation, or an explosive;
   producing detection information indicative of the item of interest;
   reading card information from a fare media using at least one of:
      a radio frequency identification (RFID) interface,
      an optical interface, or
      a magnetic interface;
   determining a threat assessment value remote from a portal based, at least in part, on a purchase of the fare media, including at least one of:
      a purchased fare product type,
      a ticket type, or
      a purchase methodology;
      wherein an identity of a user of the fare media is unknown;
   determining if action by the portal should be performed based, at least in part, on the threat assessment value and the card information; and
   performing the action with the portal, wherein the portal includes at least one of:
      a fare gate,
      a validator, or
      a fare box.

11. The method for operating the transit system to process exposure to the item of interest as recited in claim 10, wherein the determining the threat assessment value step includes steps of monitoring usage of the fare media, the transit system, and/or a station having the portal to determine the threat assessment value.

12. The method for operating the transit system to process exposure to the item of interest as recited in claim 10, wherein the step of determining if action by the portal should be performed, comprises steps of:
   formulating a quiescent index;
   determining an event associated with the threat assessment value has occurred;
   adding the quiescent index to the threat assessment value to produce a sum; and determining if the sum exceeds a predetermined threshold.

13. The method for operating the transit system to process exposure to the item of interest as recited in claim 10, wherein the step of determining if action by the portal should be performed, comprises steps of:
   determining an event associated with the threat assessment value has occurred; and
   determining if a sum that includes the threat assessment value exceeds a predetermined threshold.

14. The method for operating the transit system to process exposure to the item of interest as recited in claim 10, wherein the fare media detects the item of interest.

15. The method for operating the transit system to process exposure to the item of interest as recited in claim 10, wherein the detecting step is performed with a ticket vending machine.

16. The method for operating the transit system to process exposure to the item of interest as recited in claim 10, further comprising a step of associating the threat assessment value with an event, wherein the determining if entry should be allowed step includes a step of determining that the event has occurred and applying an action associated with the event.

17. A transportation system for processing exposure to an item of interest, the transportation system comprising:
- a detector sensitive to the item of interest, wherein:
    - the item of interest is one of a chemical, a biologic compound, radiation, or an explosive, and
    - the detector produces detection information indicative of the item of interest;
- a reader that reads card information associated with a fare media;
- an analysis subsystem that:
    - determines a threat assessment value for an event based, at least in part, on a purchase of the fare media, including at least one of:
        - a purchased fare product type,
        - a ticket type, or
        - a purchase methodology;
    - wherein an identity of a user of the fare media is unknown; and
- communicates the threat assessment value to a station device; and
- the station device that uses the threat assessment value and one or more of the card information or detection information to determine if an action should be performed, wherein the action is taken based upon the threat assessment value and the event occurring.

18. The transportation system for processing exposure to the item of interest as recited in claim 17, wherein the detector is embodied in the fare media.

19. The transportation system for processing exposure to the item of interest as recited in claim 17, wherein the threat assessment value is determined at a location remote from the portal.

20. The transportation system for processing exposure to the item of interest as recited in claim 17, wherein the fare media is a contactless smart card.

21. The transportation system for processing exposure to the item of interest as recited in claim 17, wherein the reader reads card information wirelessly.

22. The transportation system for processing exposure to the item of interest as recited in claim 17, wherein the portal, station device and reader are part of a fare gate.

* * * * *